United States Patent [19]
Davis et al.

[11] Patent Number: 5,317,614
[45] Date of Patent: May 31, 1994

[54] PROGRAMMABLE ELECTRONIC ANGULAR POSITION INDICATOR BASED UPON ENGINEERING UNITS

[75] Inventors: Richard D. Davis; Jeff Kotowski, both of Nevada City, Calif.

[73] Assignee: Silicon Systems, Inc., Tustin, Calif.

[21] Appl. No.: 935,823

[22] Filed: Aug. 26, 1992

[51] Int. Cl.$^5$ .............................................. G07C 3/02
[52] U.S. Cl. ...................................................... 377/17
[58] Field of Search ............................................ 377/17

[56] References Cited

U.S. PATENT DOCUMENTS

| | | |
|---|---|---|
| 4,897,647 | 1/1990 | Sakamoto et al. ........... 377/17 |
| 4,951,300 | 8/1990 | Koike ................................ 377/17 |
| 5,202,842 | 4/1993 | Suzuki ............................... 377/17 |

Primary Examiner—Margaret R. Wambach
Attorney, Agent, or Firm—Hecker & Harriman

[57] ABSTRACT

A programmable, electronic, angular position indicator, based upon engineering units, estimates the angular displacement of a rotating rotor. The angular position indicator is programmed with the particular arrangement of teeth (or other markings) on the rotor. Intermediate angular displacements are interpolated between a limited number of positive angular displacement indications. Offsets, due to acceleration or deceleration of the rotor, are corrected at each positive angular displacement indication without skipping the output of each interpolated angular displacement. Angular displacement is determined in standard engineering units.

18 Claims, 6 Drawing Sheets

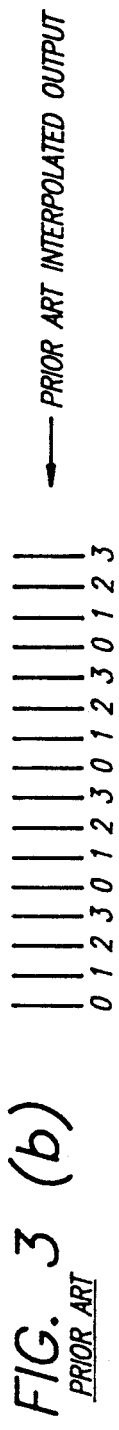
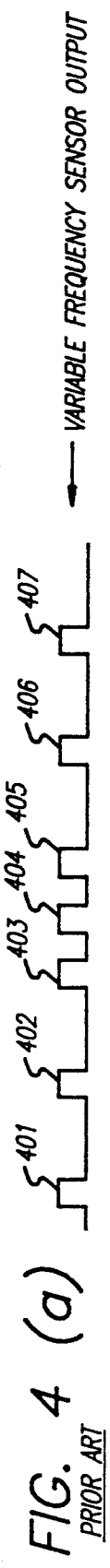
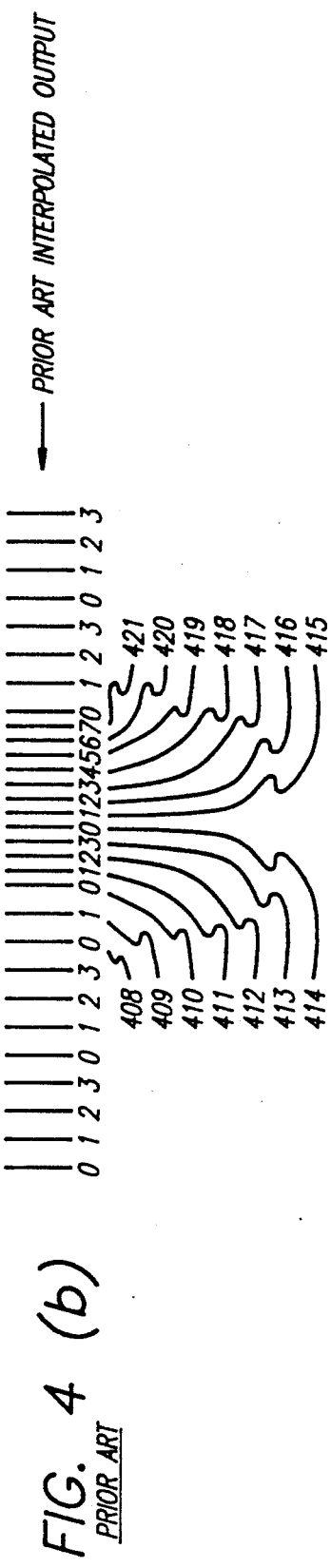
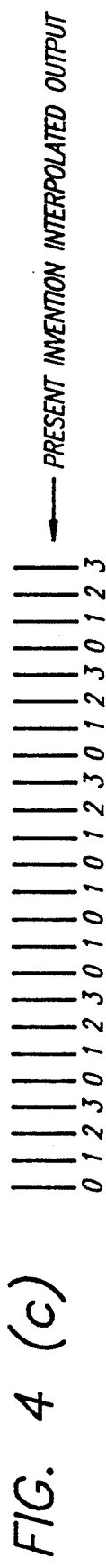
FIG. 3(a) PRIOR ART
FIG. 3(b) PRIOR ART
FIG. 4(a) PRIOR ART
FIG. 4(b) PRIOR ART
FIG. 4(c)

FIG. 5 (a) PRIOR ART
CONSTANT FREQUENCY SENSOR OUTPUT
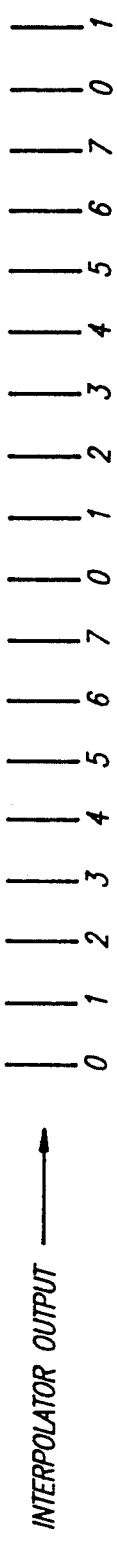
FIG. 5 (b) PRIOR ART
INTERPOLATOR OUTPUT
FIG. 5 (c) PRIOR ART
ACCELERATED SENSOR OUTPUT

PRIOR ART  INTERPOLATOR OUTPUT

PRIOR ART  PRIOR ART PULSE STUFFING

PRESENT INVENTION PULSE STUFFING

PROGRAMMABLE ELECTRONIC ANGULAR POSITION INDICATOR BASED UPON ENGINEERING UNITS

BACKGROUND OF THE INVENTION

1. Field of the Invention

The present invention relates to the field of angular position indicators.

2. Background Art

Many applications require precise information regarding the angular position of a rotating shaft. For example, in automotive applications, engine operations are synchronized with the angular position of the cam shaft or crank shaft. In an internal combustion engine, certain engine operations, such as the firing of spark plugs, the opening and closing of engine valves, injection of fuel, etc., are controlled to maximize fuel efficiency, minimize exhaust emissions, and increase engine perfomance. This control is provided by synchronizing these operations with the angular position of a rotating crankshaft and/or camshaft.

Many methods are utilized to translate the rotation of a shaft into electrical signals. In one application a marked rotor, formed as a portion of a shaft or mechanically coupled to a shaft, rotates as the shaft rotates. A sensor, positioned near the spinning rotor, produces an electronic pulse signal each time a mark on the rotor passes through its sensing field. By counting pulses in the sensor's output waveform, the angular displacement of the rotor is determined at a resolution inversely proportional to the interval between marks.

Because of practical limitations on the construction of a rotor and the sensitivity of sensors, only a finite number of marks may be positioned on the rotor. This limitation limits the resolution of angular displacement measurements. For example, in some prior art applications, angular displacement can only be determined in 10° increments.

Many applications require angular displacement information at resolutions finer than those attainable by simply detecting the passage of marks on a spinning rotor. Some prior art angular position indicators interpolate between pulses in the sensor output waveform. These prior art schemes estimate future pulse intervals based upon past measured pulse intervals. By dividing the interval between sensor pulses into finer partitions, the resolution of angular displacement information is increased.

One prior art method of interpolating between sensor pulses is to trigger a counter each time a sensor pulse occurs. The counter outputs pulses at a frequency locked at a fixed multiple of the sensor pulse frequency. The resulting waveform, comprised of sensor pulses and interpolated pulses, corresponds to angular positions between marks on a rotor with uniform mark spacing. The interpolated pulses provided by the counter are utilized to trigger events.

FIG. 1 illustrates an angular position indicating system utilizing a rotor with uniform mark spacing. A rotating shaft 101 is coupled to a rotor 102. The rotor 102 has eight uniformly-spaced marks (teeth) 103 on its perimeter. The sensor 104 is coupled to angular position indicator logic 105 and synchronization circuitry 106. Angular position indicator logic 105 is also coupled to synchronization circuitry 106.

As each of the teeth 103 passes through a specified region, it is detected by a sensor 104. The sensor 104 outputs a pulse signal each time it detects a tooth. The angular position indicator logic 105 receives the pulse signal from the sensor 104 and interpolates pulses between the sensor pulses to produce angular displacement information with increased resolution. The synchronization circuitry 106 monitors the output of the sensor 104 to verify that particular angular positions on the rotor correspond to particular pulses in the sensor output waveform. The angular position indicator logic 105 uses the output of the synchronization circuitry 106 to maintain synchronization with the rotating rotor.

FIG. 2 illustrates an angular position indicating system utilizing a rotor with non-uniform mark spacing. In FIG. 2, a rotating shaft 101 is coupled to a rotor 202 such that the rotor spins as the shaft rotates. The rotor 202 has a number of groups of marks (teeth) irregularly spaced about the circumference of the rotor. The sensor 104 is coupled to the angular position indicator logic 105 and the synchronization circuitry 106. The angular position indicator logic 105 is coupled to the synchronization circuitry 106.

When the rotor with uniform mark spacing 102 rotates at a constant velocity, the sensor 104 produces a constant frequency pulse waveform. FIG. 3A illustrates a constant frequency pulse waveform. Prior art interpolating circuits output a constant frequency interpolated pulse waveform when provided with a constant frequency sensor pulse waveform as input. FIG. 3B illustrates an interpolation of the pulse waveform of FIG. 3A. Four interpolated pulses (0–3) are produced per sensor pulse. The interpolated pulses correspond to the angular displacement of the rotor 102 when it rotates at a constant velocity.

Prior art angular position indication systems fail to accurately interpolate the angular displacement of a rotor with non-uniform mark spacing rotating at a constant velocity. When the rotor with non-uniform mark spacing 202 rotates at a constant velocity, the sensor 104 produces a variable-frequency pulse waveform. FIG. 4A illustrates a variable-frequency pulse waveform. The pulse waveform of FIG. 4A is comprised of seven pulses 401–407. The intervals after pulses 403 and 404 are half the duration of the intervals after pulses 401, 402, 405, 406, and 407.

Prior art interpolating circuits output a variable-frequency interpolated pulse waveform when provided with a variable-frequency sensor pulse. waveform as input. FIG. 4B illustrates an interpolation of the pulse waveform of FIG. 4A. Four interpolated pulses are produced after each of sensor pulses 401 and 402. Only two interpolated pulses 408 and 409 are produced after sensor pulse 403. Four interpolated pulses 410-413 are produced after sensor pulse 404. Eight interpolated pulses 414–421 are produced after sensor pulse 405. Four interpolated pulses are produced after each of sensor pulses 406 and 407. The interpolated pulse waveform of FIG. 4B fails to correspond to the angular displacement of a rotor with non-uniform mark spacing rotating at a constant velocity. FIG. 4B illustrates the inability of the prior art to properly interpolate the angular displacement of a rotor with non-uniform mark spacing.

In most applications, the rotating shaft accelerates and decelerates during normal operation. Because interpolation methods predict future pulse intervals based upon past intervals, changes in angular velocity are not reliably predicted. When sensor pulses are "early" due to acceleration of the shaft, interpolators resynchronize interpolated pulse production immediately. Interpolated pulse production for the preceding pulse interval is ceased and pulse production for the next pulse interval is commenced. Thus, the number of interpolated pulses produced per sensor pulse interval varies during periods of acceleration.

FIG. 5A, similar to FIG. 3A, illustrates a constant frequency pulse waveform. FIG. 5B illustrates an interpolation of the pulse waveform of FIG. 5A. Eight interpolated pulses (0-7) are produced per sensor pulse. The interpolated pulses correspond to the angular displacement of a rotor with uniform mark spacing 102 rotating at a constant velocity.

FIG. 5C illustrates an accelerated pulse waveform corresponding to the acceleration of a rotor with uniform mark spacing 102. Initially, the rotor 102 rotates at the same velocity as in FIG. 5A. The interval between pulses 501 and 502 has the same duration as intervals in waveform 5A. After pulse 502, the rotor suddenly accelerates to twice its original velocity. The two successive intervals between pulses 502 and 503 and between pulses 503 and 504 are half the duration of the interval between pulses 501 and 502.

FIG. 5D illustrates a typical interpolation of the sensor pulse waveform of FIG. 5C. Between pulses 501 and 502, eight interpolated pulses (0-7) are properly produced. Between pulses 502 and 503, only four interpolated pulses (0-3) are produced. The rotor 102 has traveled the same angular distance during both sensor pulse intervals. After pulse 503, the interpolator adjusts the frequency of its output. Between pulses 503 and 504, eight interpolated pulses (0-7) are properly produced. The interpolator failed to output eight interpolated pulses between sensor pulses 502 and 503. Four pulses were thus "dropped" from the interpolated pulse waveform.

One solution to the problems associated with dropped interpolated pulses is to "stuff" extra pulses into the interpolated pulse waveform when too few interpolated pulses are produced. Correction means are utilized to rapidly insert (stuff) pulses into the output waveform corresponding to the number of interpolated pulses that were dropped due to the acceleration of the rotor.

Often during periods of acceleration, several pulses are inserted by the correction means into the output waveform. The next set of interpolated pulses often arrive before the correction means has stuffed all of the dropped interpolated pulses from the previous sensor pulse interval. More pulses, corresponding to the interpolated pulses that arrived during the stuffing process, need to be stuffed into the output waveform. Greater acceleration rates increase the number of interpolated pulses that arrive during the correction periods.

The prior art pulse stuffing process is illustrated in FIG. 5E. The prior art detects the shortened pulse interval between pulses 502 and 503 of FIG. 5C. Since the interpolator only produced four interpolated pulses during this interval (0-3), four pulses need to be stuffed into the output waveform. The prior art correction means stuffs four pulses 507-510 into the output waveform. Since the negative edge of sensor pulse 503 marks the end of the sensor pulse interval, the prior art stuffs one additional pulse 509 corresponding to interpolated pulse 505. The prior art continues counting interpolated pulses, starting with pulse 511.

As depicted in FIGS. 5D and 5E, the prior art fails to stuff an additional pulse corresponding to interpolated pulse 506 which occurred during the stuffing process. During the interval between sensor pulses 503 and 504, the prior art is out of synchronization with the interpolator and thus out of synchronization with the rotor. The prior art does not detect the error until the negative edge of the next sensor pulse 504. The prior art remedies the error by stuffing additional pulses 512 and 513.

In accord with engineering custom, designers usually specify the angular displacement of a shaft in engineering units. (i.e. degrees) In prior art schemes, angular displacements, originally specified in engineering units, are converted to non-engineering units unique to the angular position indicator. Often, complex calculations are required to translate between engineering units and non-engineering units.

Different applications often employ different rotor and sensor configurations. Conventional angular position indicators require significant redesign for each particular application. Many applications utilize rotors with non-uniform mark spacing that are incompatible with prior art angular position indicators.

One prior art scheme described in Long, et al., U.S. Pat. No. 4,494,509, utilizes an analog phase locked loop to estimate shaft angular velocity and interpolate shaft angular displacement. This scheme only produces angular position information in non-engineering units. The phase locked loop of Long et al. is incompatible with a rotor with non-uniform mark spacing. Long, et al. neither utilizes nor teaches the utilization of rotors with non-uniform mark spacing.

Zerrien, Jr. et al., U.S. Pat. No. 4,814,704, describes an angular position counter which poorly estimates the angular displacement of a rotor with non-uniform mark spacing. This invention attempts to interpolate a constant number of uniformly-spaced angular positions between each pair of rotor marks. On a rotor with uniform mark spacing, the interpolated angular positions correspond to the angular displacement of the shaft. On a rotor with non-uniform mark spacing, the interpolated angular positions do not correspond to the angular displacement of the shaft. Further, this invention confusingly provides angular displacement information in non-engineering units. Zerrien, Jr. et al. teaches away from an accurate determination of the angular displacement of a rotor with non-uniform mark spacing.

Hirka et al., U.S. Pat. No. 5,041,979, describes an angular position counter which poorly estimates the angular displacement of a rotor with non-uniform mark spacing. This invention attempts to interpolate a constant number of uniformly-spaced angular positions between each pair of rotor marks. On a rotor with uniform mark spacing, the interpolated angular positions correspond to the angular displacement of the shaft. On a rotor with non-uniform mark spacing, the interpolated angular positions do not correspond to the angular displacement of the shaft. Further, this invention confusingly provides angular displacement information in non-engineering units. Hirka et al. teaches away from an accurate determination of the angular displacement of a rotor with non-uniform mark spacing.

SUMMARY

A programmable, electronic, angular position indicator, based upon engineering units, estimates the angular displacement of a rotating rotor. The angular position indicator is programmed with the particular arrangement of marks on the rotor. A plurality of sensors provides electronic pulses as marks on the rotor are detected. Intermediate rotor displacements are interpolated from the electronic pulse waveform. The interpolation algorithm is adjusted according to the programmed mark arrangement. Thus, the angular displacement of a rotor with uniform or non-uniform mark spacing is efficiently and consistently determined.

Intermediate angular displacements are interpolated between a limited number of positive angular displacement indications. Offsets, due to acceleration of the rotor, are corrected at each positive angular displacement indication. Every interpolated angular displacement is output in order. Angular displacement is determined and output in standard engineering units.

BRIEF DESCRIPTION OF THE DRAWINGS

FIG. 3A is a timing diagram illustrating a constant frequency pulse waveform.

FIG. 3B is a timing diagram illustrating an interpolation of the pulse waveform of FIG. 3A.

FIG. 4A is a timing diagram illustrating a variable frequency pulse waveform.

FIG. 4B is a timing diagram illustrating an interpolation of the pulse waveform of FIG 4A by the prior art.

FIG. 4C is a timing diagram illustrating the interpolation process of the present invention.

DETAILED DESCRIPTION OF THE INVENTION

A programmable system for the indication of angular position is described. In the following description, numerous specific details are described in order to provide a more thorough description of the present invention. It will be apparent, however, to one skilled in the art, that the present invention may be practiced without these specific details. In other instances, well known features have not been described in detail so as not to obscure the invention.

The present invention measures the angular displacement of a rotor rotatively coupled to a shaft. A plurality of marks are spaced about the perimeter of the rotor. A sensor, positioned near the spinning rotor, produces an electronic pulse signal each time a mark on the rotor passes through its sensing field. The pattern of marks on the rotor is pre-programmed into the present invention. Sensor pulse intervals are measured and compared with stored interval values to determine the angular displacement of the rotor. Angular displacement information is output in engineering units.

The present invention determines the angular displacement of rotors both with and without uniform mark spacing. When rotors rotate at a constant velocity, the present invention produces an appropriate constant frequency output signal. Different rotor configurations are supported by pre-programming the present invention with the pattern of marks on the rotor. Changes in rotor velocity are distinguished from non-uniform mark spacing on the rotor. Parameters of the present invention dynamically change in response to the rotor's position and mark spacing.

The interpolation of angular positions is automatically adjusted during periods of rotor accleration and deceleration.When acceleration occurs, angular displacement information is rapidly output until synchronization with the rotor is attained. No angular displacement information is skipped during the resynchronization process. When deceleration occurs, only the pre-programmed number of interpolated angular positions are output.

Figure 6:
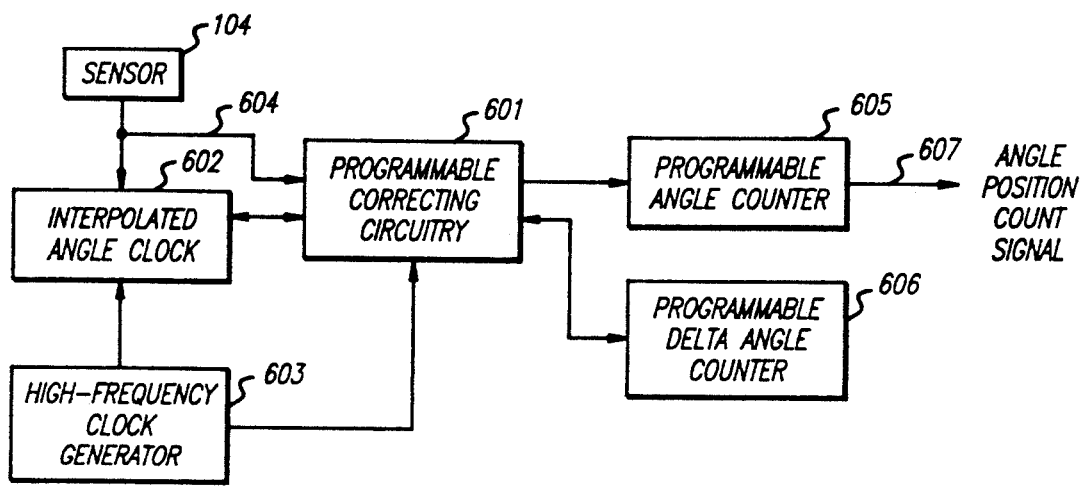
FIG. 6 is a detailed block diagram of the present invention.

FIG. 6 depicts a detailed block diagram of the present invention. A sensor 104 is coupled to an interpolated angle clock 602 and a programmable correcting circuit 601. The sensor 104 outputs a pulse waveform 604. The interpolated angle clock 602 is coupled to the programmable correcting circuit 601. A high-frequency clock generator 603 is coupled to the programmable correcting circuit 601 and the interpolated angle clock 602. The programmable correcting circuit 601 is coupled to a programmable angle counter 605 and a programmable delta angle counter 606. The programmable angle counter 605 outputs angle position count signal 607.

The sensor 104 outputs a pulse waveform 604, corresponding to rotor rotation, to the interpolated angle clock 602 and the programmable correcting circuitry 601. The high-frequency clock generator 603 provides a high-frequency clock signal to the interpolated angle clock 602 and the programmable correcting circuit 601. The programmable correcting circuitry 601 provides the interpolated angle clock 602 with operating parameters specific to the rotor.

The interpolated angle clock 602 interpolates between sensor waveform 604 pulses. The high-frequency clock signal is utilized to measure sensor pulse intervals and produce interpolated pulses. Measured sensor pulse intervals are utilized as approximations of subsequent sensor pulse intervals. The intervals between interpolated pulses are calculated from approximations of the sensor pulse interval and operating parameters from the programmable correcting circuitry 601. The interpolated waveform is provided to the programmable correcting circuit 601.

The programmable correcting circuitry 601 checks the correlation between the interpolated pulse waveform and the pre-programmed pattern of marks. The interpolated pulse waveform is corrected when necessary. Changes in rotor velocity are distinguished from non-uniform mark spacing on the rotor. If acceleration has occurred, extra pulses are stuffed into the interpolated pulse waveform. The extra pulses are provided by the high-frequency clock generator 603. If deceleration has occurred, the interpolated angle clock 602 is temporarily disabled. The corrected interpolated pulse waveform is output to the angle counter 605 and the programmable delta angle counter 606.

The programmable delta angle counter 606 counts the number of interpolated pulses produced during a sensor pulse interval. The programmable delta angle counter 606 is clocked by the corrected interpolated waveform from the programmable correcting circuitry 601. The pattern of rotor marks is pre-programmed into the programmable delta angle counter 606. Specifically, the number of interpolated positions between rotor marks are stored. The programmable delta angle counter 606 counts down from the stored value and provides the count to the programmable correcting circuitry 601.

The programmable angle counter 605 produces the angle position count signal 607 in engineering units. The count begins at an identified synchronization point and is incremented in pre-programmed increments. The corrected interpolated pulse waveform, output by the programmable correcting circuitry 601, clocks the programmable angle counter 605. The angle position count signal 607 thus represents the angular displacement of the rotor.

The sensor 104 detects the presence and absence of reference markings on a rotating rotor and outputs a pulse signal when a reference marking is detected. The high-frequency clock generator 603 generates a high-frequency clock signal. The interpolated angle clock 602 produces a maximum of N interpolated pulses between pairs of sensor pulses 604 at a rate dependent on the frequency of the sensor pulses 604.

The programmable correcting circuitry 601 can monitor the acceleration and deceleration of the rotor. The programmable correcting circuitry 601 produces a corrected interpolated pulse signal by adding a number of pulses to the waveform of interpolated pulses. The programmable delta angle counter 606 counts the number of pulses in the corrected interpolated pulse signal. The programmable delta angle counter 606 causes the programmable correcting circuitry 601 to add additional pulses to the corrected interpolated pulse signal so that N corrected interpolated pulse signals occur after each sensor pulse 604. N is a programmable value and N may change, depending on the angular distance between the markings on the rotor. The programmable correcting circuitry 601 further adds a number of pulses to the corrected interpolated pulse signal, equal to the number of interpolated pulses that have occurred during the stuffing period, since the last sensor pulse. The programmable angle counter 605 produces an angle position count signal indicative of the angular position of the rotor.

Figure 7:
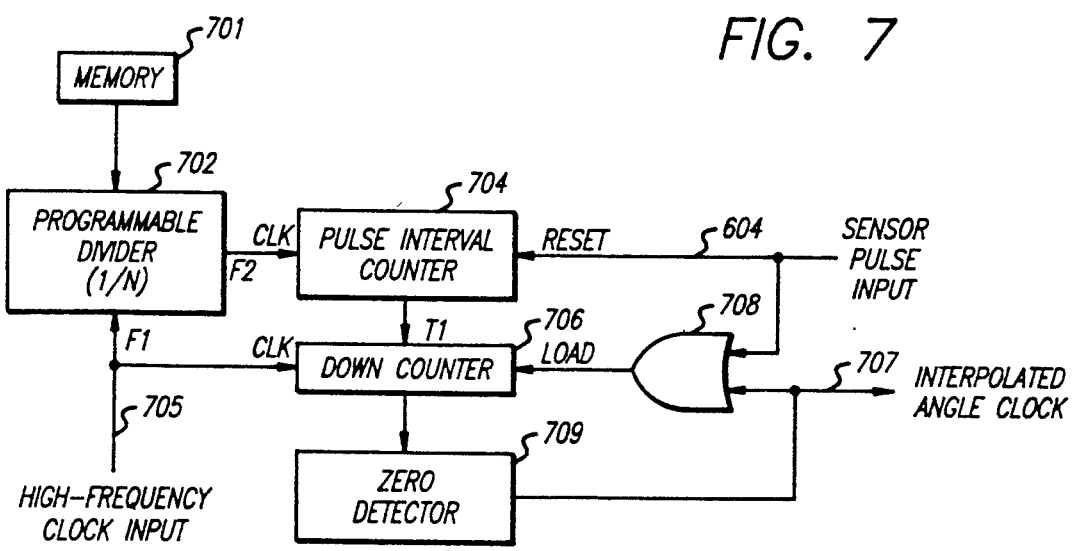
FIG. 7 is a detailed block diagram of the interpolated angle clock of the present invention.

FIG. 7 is a detailed block diagram of the interpolated angle clock 602 of FIG. 6. The interpolated angle clock 602 is comprised of a memory 701, a programmable divider 702, a pulse interval counter 704, a down counter 706, an OR gate 708, and a zero detector 709.

The data output of memory block 701 is coupled to the selection input of programmable divider 702. A high-frequency clock signal 705 is coupled to the waveform input of the programmable divider 702 and the clock input of the down counter 706. The output of the programmable divider 702 is coupled to the clock input of the pulse interval counter 704. The data output of the pulse interval counter 704 is coupled to the data input of the down counter 706. The sensor pulse input signal 604 is coupled to an input of OR gate 708 and the reset input of the pulse interval counter 704. The data output of down counter 706 is coupled to the data input of zero detector 709. The output of zero detector 709 is coupled to an input of OR gate 708 and the interpolated angle clock output signal 707. The output of OR gate 708 is coupled to the load input of down counter 706.

The high-frequency clock signal 705 provides a pulse signal of frequency $F_1$. A value provided by the memory block 701 selects the operation of programmable divider 702 to divide by a specific value N. As explained below, the value of N determines the number of interpolated pulses that the down counter 706 creates. The value of N can be changed after each sensor pulse to accommodate non-uniform mark spacing on the rotor. The programmable divider 702 slows the frequency $F_1$ by a factor of N, producing a pulse signal of frequency $F_2$. $F_1 \div N = F_2$.

The pulse interval counter 704 determines the length of the interval between sensor pulses 604. The pulse interval counter 704 is clocked at a frequency $F_2$. Each pulse of the sensor pulse signal 604 resets the pulse interval counter 704 and pulses the load input of the down counter 706. The value held by the pulse interval counter 704, just before it is reset by a sensor pulse, represents the length of the interval. The interval length T1 is latched at the output of the pulse interval counter 704 and transmitted to the down counter 706.

The down counter 706 is clocked at a frequency $F_1$. The down counter 706 counts down N times from the value T1 to zero. When the down counter 706 reaches a zero value, zero detector 709 pulses the interpolated angle clock signal 707 and an input of OR gate 708. A high signal output by OR gate 708 enables the load input of the down counter 706. The down counter 706 is reloaded with a value T1 from the pulse interval counter 704, and the process repeats. In this manner, the down counter 706 produces N interpolated pulses after a particular sensor signal 604 pulse.

When the rotor rotates at a constant velocity, the interpolated angle clock signal 707 partitions the interval between two sensor pulses into N equal intervals. Even though the time interval between pairs of sensor pulses 604 may vary considerably due to non-uniform mark spacing, a constant frequency interpolated angle clock pulse signal 707 can be produced. Acceleration or deceleration of the rotor can cause the interpolated angle clock signal 707 to partition the interval between two sensor pulses into less than N intervals or into N unequal intervals.

The time interval between two sensor pulses is measured by the pulse interval counter 704 at a frequency $F_2$. The length of the interval is equal to T1. The value T1 is loaded into the down counter 706 which is clocked at frequency $F_1(F_1 = F_2 \times N)$. When the down counter 706 reaches zero, it is reloaded with a value T1 and the process repeats. The pulse train resulting from the zero detector 709 thus represents an interpolated signal with N times more resolution than the sensor pulse signal 604.

Angular positions are accurately interpolated on rotors with non-uniform mark spacing by appropriately programming the value N. Proper programming of N has the beneficial result of enabling the count contained in the pulse interval counter 704 to represent the "time per angular displacement" of the rotor. In this manner, the angular velocity of the rotor is determined for every tooth interval.

FIG. 4C illustrates the interpolation process of the present invention. The interpolated angle clock of FIG. 7 is pre-programmed with the rotor mark pattern. N is set to an initial value of 4. The interpolated angle clock is provided with the variable frequency sensor output waveform of FIG. 4A which was produced by the rotor with non-uniform mark spacing rotating at a constant velocity. The present invention produces four interpolated pulses (0–3) after each of sensor pulses 401 and 402 of FIG. 4A. N is then reset to a value of 2, corresponding to the smaller interval between marks on this section of the rotor. The present invention produces two interpolated pulses (0–1) after each of sensor pulses 403 and 404. N is then reset to a value of 4, corresponding to the longer interval between marks on this section of the rotor. The present invention produces four interpolated pulses (0–3) after each of sensor pulses 405, 406, and 407. Thus, the constant velocity rotation of a rotor with non-uniform mark spacing is correctly interpolated, producing a constant frequency pulse waveform.

Figure 8:
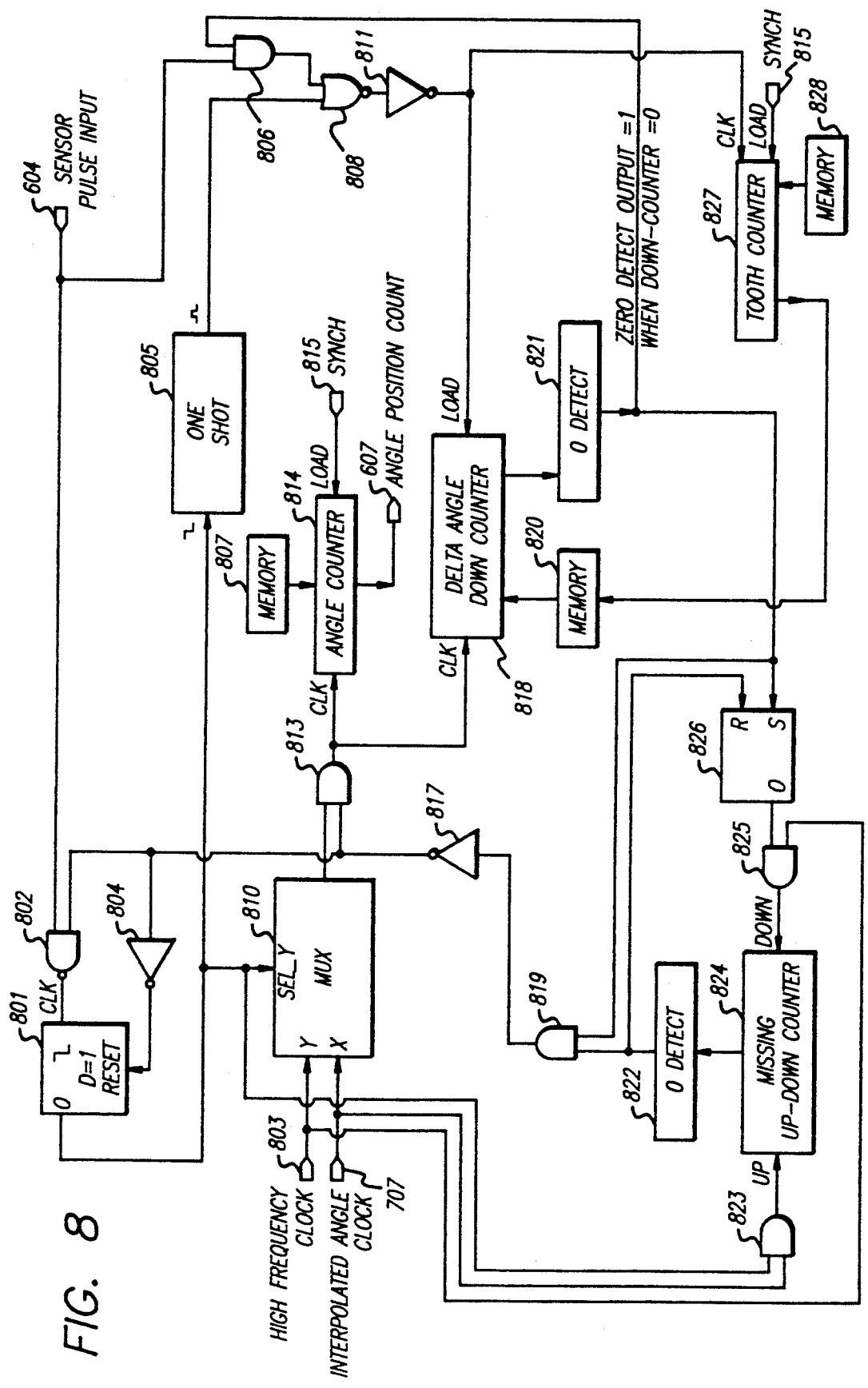
FIG. 8 is a circuit block diagram of the preferred embodiment of the present invention.

FIG. 8 is the preferred embodiment of the present invention. The high-frequency clock signal 803 is coupled to the Y input of multiplexer 810 and an input of AND gate 825. The interpolated angle clock signal 707 is coupled to the X input of multiplexer 810 and an input of AND gate 823. The output of D flip-flop 801 is coupled to the Y-select input of multiplexer 810, the input of one-shot 805, and an input of AND gate 823. The output of multiplexer 810 is coupled to an input of AND gate 813.

The output of AND gate 823 is coupled to the up input of the missing up-down counter 824. The output of AND gate 825 is coupled to the down input of the missing up-down counter 824. The data output of the missing up-down counter 824 is coupled to the input of zero detector 822. The output of zero detector 822 is coupled to an input of AND gate 819 and the reset input of RS flip-flop 826. The output of RS flip-flop 826 is coupled to an input of AND gate 825. The output of AND gate 819 is coupled to the input of inverter 817. The output of inverter 817 is coupled to an input of AND gate 813, the input of inverter 804, and an input of NAND gate 802.

The output of inverter 804 is coupled to the reset input of D flip-flop 801. The sensor pulse input signal 604 is coupled to an input of AND gate 806 and an input of NAND gate 802. The output of NAND gate 802 is coupled to the clock input of D flip-flop 801. D flip-flop 801 is a negative edge triggered flip-flop. The D input of D flip-flop 801 is coupled to a high signal.

The output of AND gate 813 is coupled to the clock input of angle counter 814 and the clock input of delta angle down counter 818. Memory block 807 is coupled to the data input of angle counter 814. Memory block 828 is coupled to the data input of tooth counter 827. The synchronization signal 815 is coupled to the load input of angle counter 814 and the load input of tooth counter 827. The output of the angle counter 814 is coupled to output signal angle position count 607.

The output of one-shot 805 is coupled to an input of NOR gate 808. The output of AND gate 806 is coupled to an input of NOR gate 808. The output of NOR gate 808 is coupled to the input of inverter 811. The output of inverter 811 is coupled to the load input of the delta angle down counter 818 and the clock input of the tooth counter 827. The output of the delta angle down counter 818 is coupled to the input of zero detector 821. The output of the zero detector 821 is coupled to the set input of RS flip-flop 826 and an input of AND gate 806. The data output of the tooth counter 827 is coupled to the address input of memory block 820. The data output of memory block 820 is coupled to the data input of delta angle down counter 818.

The following describes the operation of the circuit of FIG. 8 after synch signal 815 changes from a low signal to a high signal. Assume that the sensor pulse input signal 604 is a low signal, D flip-flop 801 is reset, and missing up-down counter 824 is initialized to a zero value. The synch signal 815 pulse causes tooth counter 827 to load a value corresponding to the current rotor position. The output of tooth counter 827 addresses memory block 820. Delta angle down counter 818 initially contains a non-zero value. The synch signal 815 enables the load input of angle counter 814, causing it to load a value from memory block 807. The values stored in memory block 807 represent the correct angle count for particular synchronization points.

Delta angle down counter 818 contains a non-zero value. Zero detector 821 outputs a low signal, disabling AND gate 806 and AND gate 819. Missing up-down counter 824 initially contains a zero value. Zero detector 822 outputs a high signal which resets RS flip-flop 826. Disabled AND gate 819 outputs a low signal which is inverted by inverter 817. A high signal is presented to one input of AND gate 813, enabling the output of multiplexer 810 to clock the angle counter 814 and the delta angle down counter 818. The high signal output by inverter 817 is also presented to an input of NAND gate 802 and the input of inverter 804. The low signal output by inverter 804 disables the reset input of D flip-flop 801.

A low signal on sensor pulse input signal 604 presents a low signal to an input of NAND gate 802. NAND gate 802 outputs a high signal. The low signal output by D flip-flop 801 disables AND gate 823 and causes multiplexer 810 to pass the interpolated angle clock signal 707. Disabled AND gate 823 disables the up input of missing up-down counter 824. Thus, the circuit is set so that the interpolated angle signal 707 clocks the angle counter 814 and the delta angle down counter 818.

One shot 805 presents a low signal to an input of NOR gate 808. AND gate 806 presents a low signal to an input of NOR gate 808. NOR gate 808 outputs a high signal which is inverted by inverter 811. The low signal output by inverter 811 disables the load input of the delta angle down counter 818 and the clock input of the tooth counter 827.

The interpolated angle clock signal 707 is an interpolated pulse waveform provided by the circuitry of FIG. 7. The high frequency clock signal 803 is a regular pulse waveform at a frequency higher than that of the interpolated angle clock signal 803. The high-frequency clock signal 707 is not necessarily the same frequency as the high-frequency clock signal 603 of FIG. 6.

The interpolated angle clock signal 707 clocks the angle counter 814 and the delta angle down counter 818. The angle counter 814 counts, in preprogrammed increments, from an initial angle count provided by memory block 807. The angle count is output as angle position count signal 607 in engineering units. The delta angle down counter 818 counts down from an initial value, provided by memory block 820, to zero. Thus, the delta angle down counter 818 counts the number of interpolated pulses produced during each sensor pulse interval.

If the rotor's angular velocity is constant or has decreased during a sensor pulse interval, the delta angle down counter 818 reaches a zero value before the negative edge of the sensor pulse input signal 604 pulse. Zero detector 821 outputs a high signal which causes AND gate 819 to output a high signal. The high signal is inverted by inverter 817. The low signal disables AND gate 813 and causes NAND gate 802 to output a high signal. The angle counter 814 is thus no longer clocked. The circuit waits for the sensor pulse signal 604 negative edge before further angular displacement information is outputted.

The high signal output by AND gate 819 also resets D flip-flop 801. Reset D flip-flop 801 causes multiplexer 810 to continue passing the interpolated angle clock signal 707 to an input of AND gate 813 and disables AND gate 823.

The high signal output by zero detector 821 allows AND gate 806 to pass the sensor pulse 604 to the input of NOR gate 808. NOR gate 808, together with inverter 811, passes the pulse, enabling the load input of delta angle down counter 818 and clocking the tooth counter 827. Tooth counter 827 outputs a new address which accesses a memory location in memory block 820. Delta angle down counter 818 loads a non-zero value from the memory block 820. In response, the zero detector 821 outputs a low signal, which terminates this load pulse.

If the rotor accelerates substantially, the sensor pulse input signal 604 pulses before the delta angle down counter 818 reaches a zero value. D flip-flop 801 is clocked, causing it to output a high signal. The high signal is presented to an input of AND gate 823, enabling subsequent pulses on the interpolated angle clock signal 707 to clock up the missing up-down counter 824. The high signal output by D flip-flop 801 also causes multiplexer 810 to select its Y input. This results in high-frequency clock signal 803 clocking the angle counter 814 and the delta angle down counter 818. High-frequency pulses are thus stuffed into the angle counter 814. Simultaneously, the high-frequency pulses are clocking down delta angle down counter 818. Once the pre-programmed number of interpolated pulses has been counted by the delta angle down counter 818, the zero detector 821 outputs a high signal.

If no pulses on the interpolated angle clock signal 707 have occurred during the period of pulse stuffing, the output of zero detector 822 is a high signal. The two high signals from zero detectors 821 and 822 are combined to reset D flip-flop 801. The negative edge output by D flip-flop 801 triggers one shot 805. The pulse output of one shot 805 is passed by NOR gate 808 and inverter 811, causing the delta angle down counter 818 to load and clocking the tooth counter 827.

If pulses on the interpolated angle clock signal 707 occur during the period of pulse stuffing, they are counted by the missing up-down counter 824. A non-zero value in the missing up-down counter 824 causes zero detector 822 to output a low signal. The low signal disables AND gate 819 and is presented to the reset input of RS flip-flop 826. The low signal output by AND gate 819 is inverted by inverter 817. The high signal outputted by inverter 817 enables AND gate 813 to continue to pass the high-frequency clock signal 803 to the angle counter 814 and the delta angle down counter 818.

When the delta angle down counter 818 reaches a zero value, zero detector 821 outputs a high signal which sets RS flip-flop 826. The high signal output by RS flip-flop 826 enables AND gate 825 to pass the high-frequency clock signal 803 to the down input of missing up-down counter 824. Thus, the high-frequency clock signal 803 simultaneously clocks through AND gate 813 and clocks down the missing up-down counter 824. The angle counter 814 and the delta angle down counter 818 are thus additionally stuffed with the number of pulses that occur on the interpolated angle clock signal 707 during the pulse stuffing process. When the missing up-down counter 824 reaches a zero value, zero detector 822 outputs a high signal. A high signal output by AND gate 819 resets D flip-flop 801, which allows "normal" clocking by the interpolated angle clock signal 707 to resume.

Figure 1:
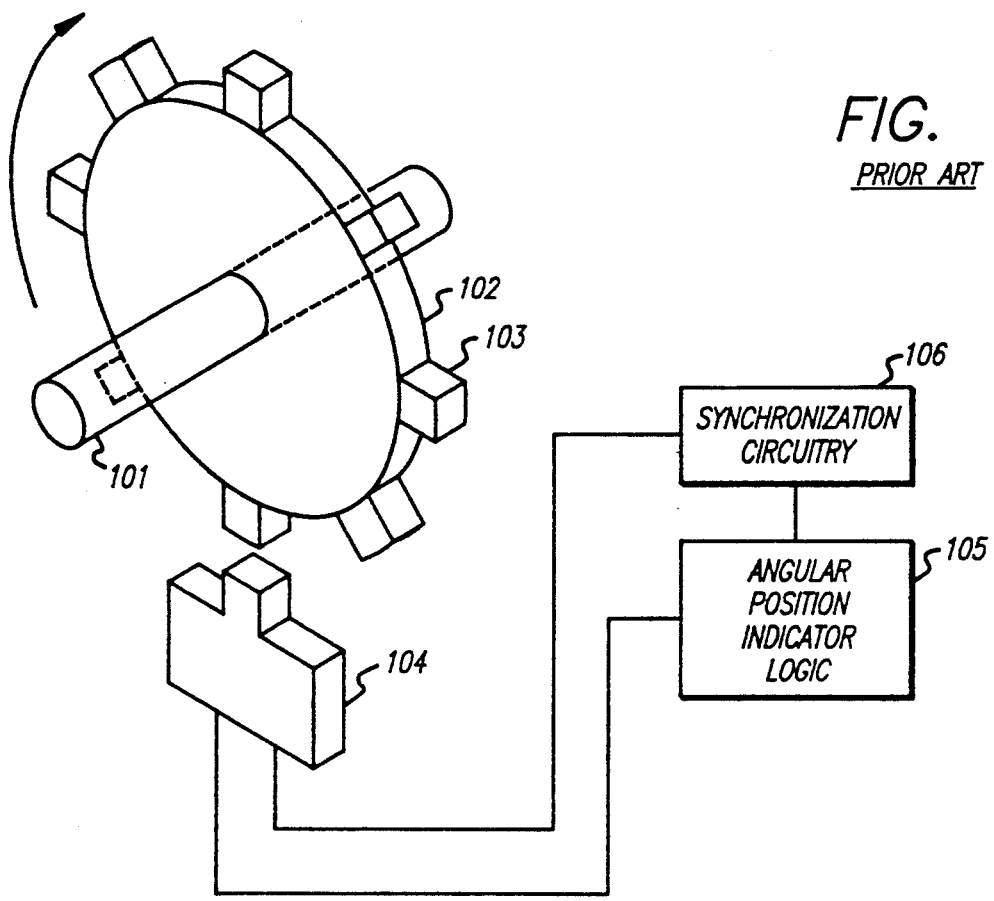
FIG. 1 is a block diagram of a system for estimating the angular displacement of a rotor with uniform mark spacing.
Figure 2:
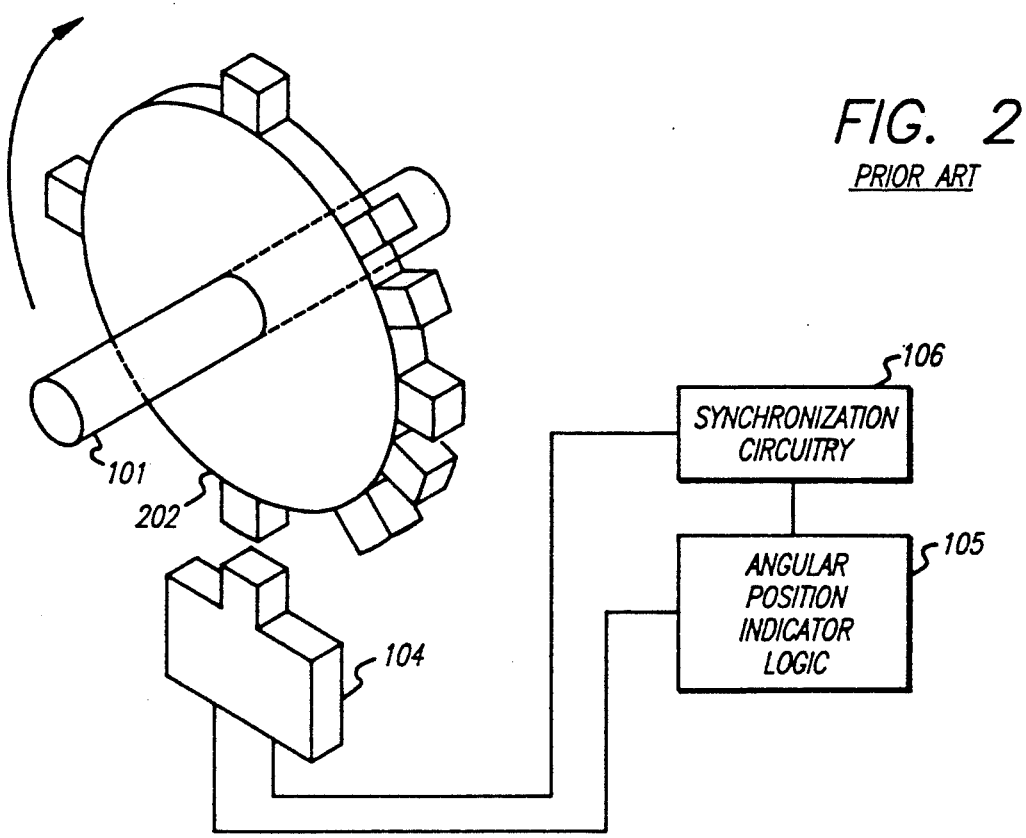
FIG. 2 is a block diagram of a system for estimating the angular displacement of a rotor with non-uniform mark spacing.
Figure 5:
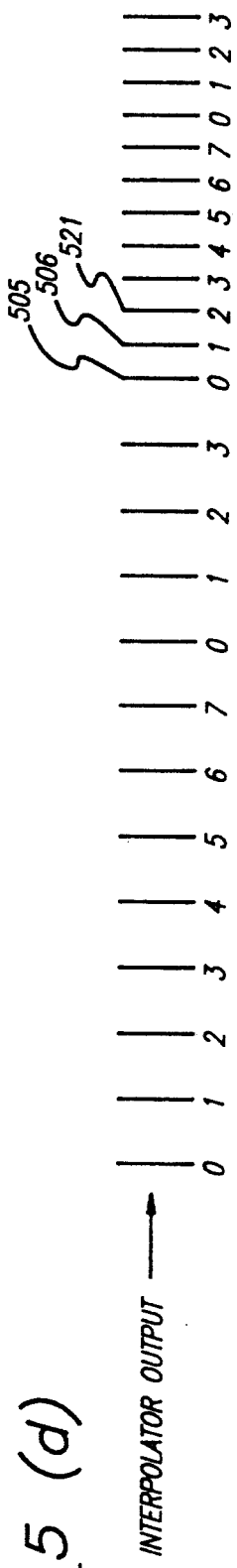
FIG. 5A is a timing diagram illustrating a constant frequency pulse waveform.
FIG. 5B is a timing diagram illustrating an interpolation of the pulse waveform of FIG. 5A.
FIG. 5C is a timing diagram illustrating an accelerated pulse waveform.
FIG. 5D is a timing diagram illustrating an interpolation of the waveform of FIG. 5C.
FIG. 5E is a timing diagram illustrating the prior art pulse stuffing process.
FIG. 5F is a timing diagram illustrating the pulse stuffing process of the present invention.
Figure 5:
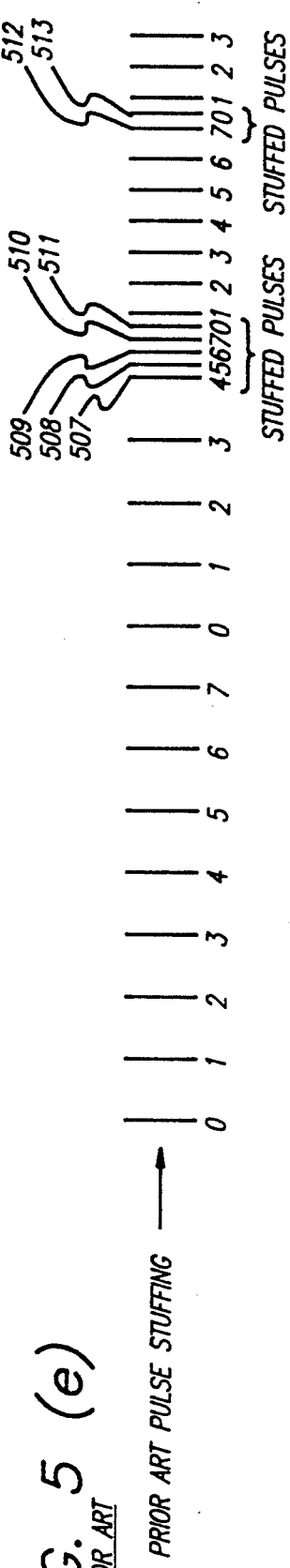
Figure 5:
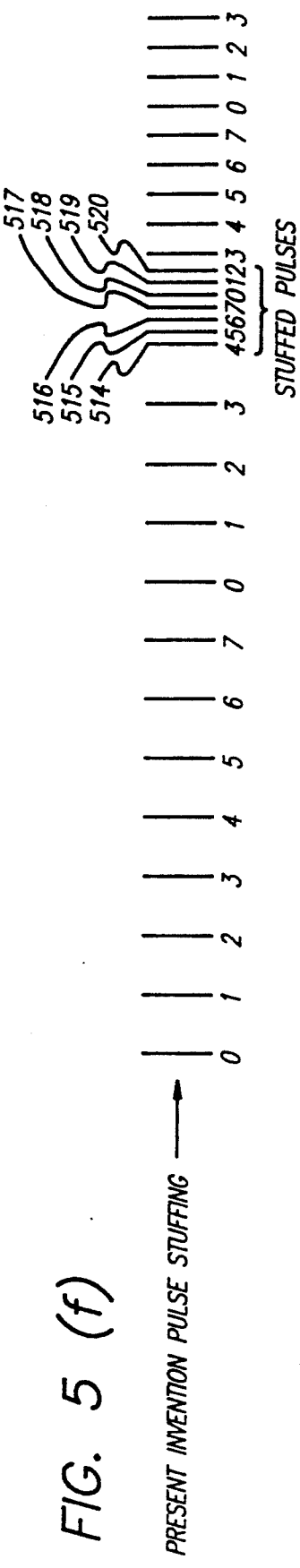

The pulse stuffing process of the present invention is illustrated in FIG. 5F. In particular, FIG. 5F illustrates the signal which clocks the angle counter 814 to produce the angle position count signal 607. The present invention detects the shortened pulse interval between pulses 502 and 503 of FIG. 5C. Since the interpolator only produced four interpolated pulses during this interval (0-3), four more pulses need to be stuffed into the clocking signal. The present invention stuffs four pulses 514-517 into the clocking signal, corresponding to the four dropped pulses. An additional three pulses 518, 519, and 520 are stuffed, corresponding to the three interpolated pulses 505, 506, and 521 detected during the stuffing process. The present invention continues counting interpolated pulses, starting with pulse 520. The angle position count is synchronized with the interpolator output immediately following completion of the stuffing process.

As illustrated in FIG. 5F, the present invention adds pulses to the clocking signal so that N pulses are produced after each sensor pulse. A number of additional pulses, equal to the number of interpolated pulses that have occurred since the last sensor pulse, are also added to the clocking signal. In this case, four pulses 514-517 are added so that eight pulses are produced after sensor pulse 502. Three additional pulses 518-520 are added because three interpolated pulses 505, 506, and 521 occurred after sensor pulse 503, during the stuffing process. Once the pulse stuffing process is completed, the angle position count provided by the present invention is again synchronized with the pulses produced by the interpolator and thus synchronized with the rotor.

We claim:

1. A circuit comprising:
    a detector for detecting the presence and absence of a reference marking on a rotating rotor, said detector outputting a first signal when the presence of a reference marking is detected;
    an interpolator coupled to said detector, said interpolator responsive to said first signal, said interpolator outputting a maximum of N interpolated position pulses between occurrences of said first signal, where the value of N changes and is dependent on angular distance between said reference markings;
    an angle counter coupled to said interpolator, said angle counter responsive to said first signal and to said interpolated position pulses and generating an angle position signal indicating angular position of said rotor relative to said reference marking.

2. The circuit of claim 1 wherein said interpolator includes correction means for detecting acceleration and deceleration of said rotor and for controlling a rate of output of said interpolated position pulses.

3. The circuit of claim 1 wherein said value of N is programmed in said interpolator.

4. The circuit of claim 1 wherein said angle position signals are in engineering units.

5. A method of providing angular position signals corresponding to an angular position of a rotating rotor, said rotating rotor having a plurality of reference markings thereon, said method comprising the steps of:
using a detector, detecting the presence and absence of a reference marking on a rotating rotor;
outputting a first signal when the presence of a reference marking is detected;
using an interpolator responsive to said first signal, outputting a maximum of N interpolated position pulses between occurrences of said first signal, where the value of N changes and is dependent on angular distance between said reference markings;
using an angle counter responsive to said first signal and to said interpolated position pulses, generating an angle position signal indicating angular position of said rotor.

6. The method of claim 5 wherein said interpolator includes correction means for detecting acceleration and deceleration of said rotor and for controlling a rate of output of said interpolated position pulses.

7. The method of claim 5 wherein said value of N is programmed in said interpolator.

8. The method of claim 5 wherein said angle position signals are in engineering units.

9. A circuit comprising:
a detector for detecting the presence and absence of a reference marking on a rotating rotor, said detector outputting a first signal when the presence of a reference marking is detected;
a high frequency clock generator for generating a clock signal of frequency F1;
an interpolated angle clock coupled to said detector and to said high frequency clock generator, said interpolated angle clock responsive to said first signal and said clock signal, said interpolated angle clock outputting a maximum of N interpolated pulses between occurrences of said first signal at a rate dependent on the rate of occurrence of said first signal;
a correcting circuit coupled to said detector, said interpolated angle clock and to said high frequency clock, said correcting circuit responsive to said first signal, said interpolated pulses and to said clock signal, said correcting circuit outputting a corrected interpolated pulse signal, and adding additional corrected interpolated pulse signals when necessary until the number of additional corrected interpolated pulse signals is equal to the number of interpolated pulses that have occurred since the last occurrence of said first signal;
a programmable delta angle counter coupled to said correcting circuit, said programmable delta angle counter responsive to said corrected interpolated pulse signal, said programmable delta angle counter for counting said corrected interpolated pulse signals and causing said correcting circuit to provide additional corrected interpolated pulse signals so that N corrected interpolated pulse signals are provided after each occurrence of said first signal;
an angle counter coupled to said correcting circuit and to said programmable delta angle counter, said angle counter responsive to said corrected interpolated pulse signal, said angle counter outputting angle position signals indicative of angular position of said rotor.

10. The circuit of claim 9 wherein said angle position signals are in engineering units.

11. The circuit of claim 9 wherein N is a programmable value.

12. The circuit of claim 9 wherein said correcting circuit monitors acceleration and deceleration of said rotor.

13. The circuit of claim 9 wherein N changes and is dependent on angular distance between said reference markings.

14. A method of providing angular position signals corresponding to an angular position of a rotating rotor, said rotating rotor having a plurality of reference markings thereon, said method comprising the steps of:
using a detector, detecting the presence and absence of a reference marking on said rotating rotor;
outputting a first signal when the presence of a reference marking is detected;
using a high frequency clock generator, generating a clock signal of frequency F1;
using an interpolated angle clock responsive to said first signal and said clock signal, outputting a maximum of N interpolated pulses between occurrences of said first signal at a rate dependent on the rate of occurrence of said first signal;
using a correcting circuit responsive to said first signal, said interpolated pulses and to said clock signal, for outputting a corrected interpolated pulse signal;
using a programmable delta angle counter responsive to said corrected interpolated pulse signal, for counting said corrected interpolated pulse signals;
adding additional corrected interpolated pulse signals so that N corrected interpolated pulse signals are provided after each occurrence of said first signal;
adding additional corrected interpolated pulse signals when necessary until the number of additional corrected interpolated pulse signals is equal to the number of interpolated pulses that have occurred since the last occurrence of said first signal;
using an angle counter responsive to said first signal and to said interpolated position pulses, for generating an angle position signal indicating angular position of said rotor.

15. The method of claim 14 wherein said angle position signals are in engineering units.

16. The method of claim 14 wherein N is a programmable value.

17. The method of claim 14 wherein said correcting circuit monitors acceleration and deceleration of said rotor.

18. The method of claim 14 wherein N changes and is dependent on angular distance between said reference markings.

* * * * *